US008203561B2

(12) United States Patent
Carter et al.

(10) Patent No.: US 8,203,561 B2
(45) Date of Patent: Jun. 19, 2012

(54) DETERMINING VALUED EXCURSION CORRIDORS IN VIRTUAL WORLDS

(75) Inventors: William S. Carter, Round Rock, TX (US); Guido D. Corona, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/207,588

(22) Filed: Sep. 10, 2008

(65) Prior Publication Data

US 2010/0060648 A1 Mar. 11, 2010

(51) Int. Cl.
*G06T 13/00* (2011.01)
*G09G 5/00* (2006.01)
(52) U.S. Cl. .................. 345/475; 345/474; 345/633
(58) Field of Classification Search .......... 345/474, 345/475, 633
See application file for complete search history.

(56) References Cited

U.S. PATENT DOCUMENTS

| | | | | |
|---|---|---|---|---|
| 5,986,675 | A * | 11/1999 | Anderson et al. | 345/473 |
| 6,424,264 | B1 | 7/2002 | Giraldin et al. | |
| 6,831,659 | B1 * | 12/2004 | Mukoyama et al. | 345/619 |
| 7,209,036 | B2 | 4/2007 | Meyer et al. | |
| 7,293,235 | B1 * | 11/2007 | Powers et al. | 715/706 |
| 2002/0138607 | A1 * | 9/2002 | O'Rourke et al. | 709/224 |
| 2003/0014186 | A1 | 1/2003 | Adams, Jr. et al. | |
| 2005/0021472 | A1 * | 1/2005 | Gettman et al. | 705/52 |
| 2006/0098089 | A1 | 5/2006 | Sofer | |
| 2006/0246973 | A1 * | 11/2006 | Thomas et al. | 463/4 |
| 2007/0143119 | A1 * | 6/2007 | Jung et al. | 705/1 |
| 2009/0046094 | A1 * | 2/2009 | Hamilton et al. | 345/419 |
| 2009/0124349 | A1 * | 5/2009 | Dawson et al. | 463/24 |
| 2009/0217171 | A1 * | 8/2009 | Hamilton et al. | 715/736 |
| 2009/0300516 | A1 * | 12/2009 | Jerrard-Dunne et al. | 715/752 |
| 2009/0300521 | A1 * | 12/2009 | Jerrard-Dunne et al. | 715/757 |

OTHER PUBLICATIONS

Loomis et al., "Personal Guidance System for the Visually Impaired", Marina Del Rey, CA, 1994, ACM, pp. 85-91.
Lutz, "Prototyping and evaluation of landcons: auditory objects that support wayfinding for blind travelers", ACM Sigaccess Accessibility and Computing, Issue 86, Sep. 2006, pp. 8-11.
Lecuver, "HOMERE: a multimodal system for visually impaired people to explore virtual environments", 2003, Proceedings IEEE Virtual Reality 2003, Los Angeles, California, issue 22-26, pp. 1-11.
Carter et al., "Untangling the Web—Exploring Methods of Accessing Virtual Worlds", AFB AccessWorld, Mar. 2008, vol. 9, No. 2, pp. 1-12.

* cited by examiner

*Primary Examiner* — David T Welch
(74) *Attorney, Agent, or Firm* — Yee & Associates, P.C.; Libby Z. Toub

(57) ABSTRACT

A computer implemented method, computer program product, and a data processing system determine an excursion corridor within a virtual environment. A time-stamped snapshot of a location of at least one avatar within the virtual universe is recorded. An avatar tracking data structure is then updated. The avatar tracking data structure provides a time-based history of avatar locations within the virtual universe. A weighted density map is generated. The weighted density map is then correlated with virtual object locations. Each virtual object location corresponds to a virtual object. Excursion corridors are identified. The excursion corridor identifies frequently taken routes between the virtual object locations. Waypoints are identified. Each waypoint corresponds to a virtual object. Each waypoint is an endpoint for one of the excursion corridors.

12 Claims, 4 Drawing Sheets

DETERMINING VALUED EXCURSION CORRIDORS IN VIRTUAL WORLDS

BACKGROUND OF THE INVENTION

1. Field of the Invention

The present invention is related generally to a computer implemented method, a computer program product, and a data processing system. More specifically, the present invention relates to a method and apparatus for discovering valued excursion corridors in a virtual universe.

2. Description of the Related Art

A virtual universe (VU), also referred to as a metaverse or "3-D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. Objects are prevalent in virtual universes and may be used for various purposes. However, the creation and maintenance of high quality virtual universe objects is frequently expensive and time consuming.

Virtual worlds are conceptual spaces that bear various degrees of correlation to the real world. By operating a mouse—or an equivalent device—sighted users move, learn, and interact by controlling a highly personalized iconic representation of self called an avatar. The often fancifully attired avatar is the user's point of regard—an extension of the 2D cursor into a content-rich 3D environment. The avatar has visible spatial and operational relationships with nearby objects and other avatars. However, navigation and interaction within a virtual world poses unique problems for users who are blind.

Today, people who are blind can use the two-dimensional Internet successfully. Textual web content and structural elements are made available and navigable through current screen-reader technology. If web accessibility guidelines are followed, even images may be described. Screen readers' conversion of web site content into synthetic speech or Braille and users' ability to navigate a site with only the keyboard can often yield a satisfactory experience.

Virtual world graphical user interfaces often inherit a considerable set of legacy two-dimensional widgets. There already are toolbars, dropdown menus, text-entry fields, selection buttons, sliders, and many other familiar graphical user interface components. Traditional two-dimensional interactive objects also often appear when one clicks on—or moves the avatar over—any of the nearly countless denizens of the virtual world.

Wandering in an invisible environment is not a new challenge unique to 3D virtual worlds. Simple keyboard commands are often sufficient to navigate the world, and information about the surroundings can be communicated through terse and often-glib bits of text that are verbalized by a synthetic speech synthesizer or displayed on a refreshable Braille display.

However, the initial exploration of a visual environment is often confusing, and without visual cues to guide a blind user, the user can become ridiculously lost within the virtual world, trying in vain to locate a familiar object that would provide the necessary clues as to successful location determination and navigation. A blind visitor to a virtual world must be able to perform an initial exploration and navigation of the virtual environment without the frustration of dendritically stumbling around the virtual environment with no knowledge of navigating to visible landmarks or points-of-interest.

BRIEF SUMMARY OF THE INVENTION

According to one embodiment of the present invention, a computer implemented method, computer program product, and a data processing system determine an excursion corridor within a virtual environment. A time-stamped snapshot of a location of at least one avatar within the virtual universe is recorded. An avatar tracking data structure is then updated. The avatar tracking data structure provides a time-based history of avatar locations within the virtual universe. A weighted density map is generated. The weighted density map is then correlated with virtual object locations. Each virtual object location corresponds to a virtual object. Excursion corridors are identified. The excursion corridor identifies frequently taken routes between the virtual object locations. Waypoints are identified. Each waypoint corresponds to a virtual object. Each waypoint is an endpoint for one of the excursion corridors.

DETAILED DESCRIPTION OF THE INVENTION

Figure 1:
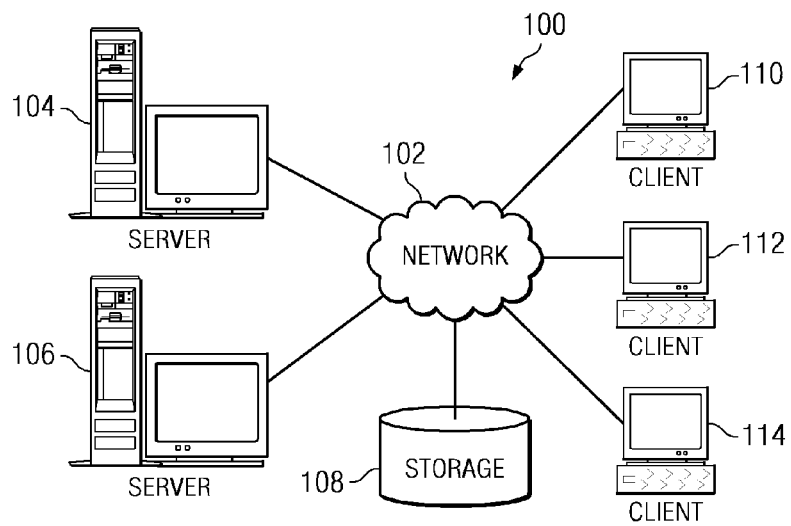
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
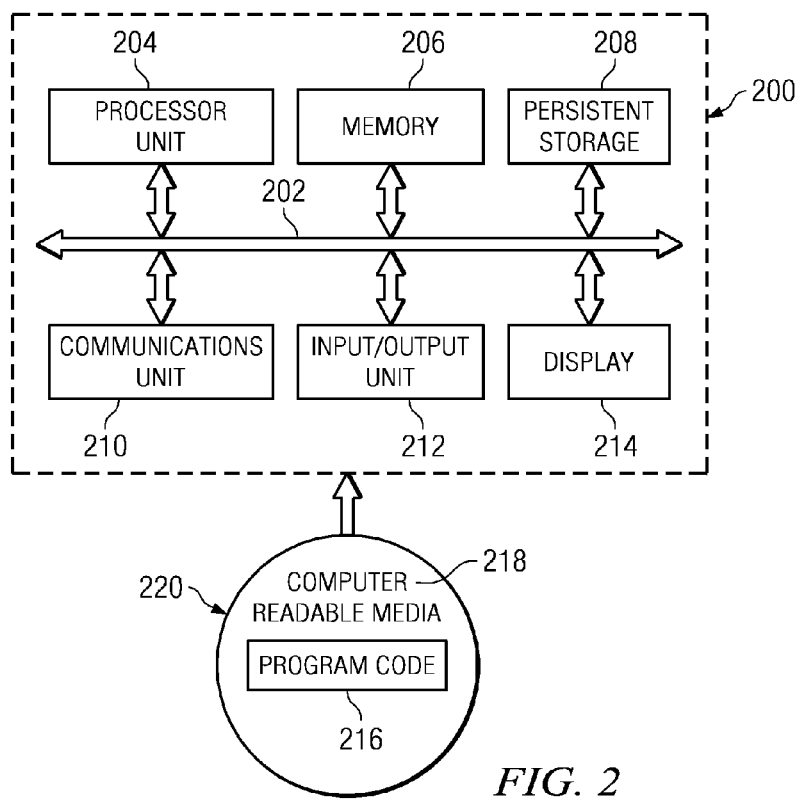
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments herein describe a method for discovering valued excursion corridors within a virtual world. Sighted users within a virtual world tend to travel purposefully using visual landmarks, even when performing an initial exploration of the virtual environment. Routes which are frequently taken by the avatars of these sighted users may represent valuable information for blind users. The cumulative travel route histories may be deemed as an interconnected set of invisible "beaten paths" which have previously been most commonly used by avatars in navigating through the virtual environment. Each path is not only a route which many other avatars have not only successfully traveled, but also is a pathway which users of those avatars valued for some reason. These paths can be offered to blind users as a set of excursion corridors.

A user can choose from a set of excursion corridors proximately located to the user's avatar. The chosen excursion corridor can be selected from a menu listing the nearby virtual paths, as well as their related endpoints, or points-of-interest that lie along the excursion corridor. Once the excursion corridor is selected, the user could be automatically navigated along the excursion corridor. Conversely, a set of navigational cues could be provided to the user that would enable the user to maintain travel along the selected excursion corridor. The navigational cues could be a visual cues, such as a luminescent trail, a three dimensional network of lines, a texture overlay, a discolored ground appearance depicting a "worn" pathway. The navigational cues could also be auditory cues, such as a tone or audio signal to alert the user of when the avatar is within the selected excursion corridor, or has wandered too far off of the selected excursion corridor.

Figure 3:
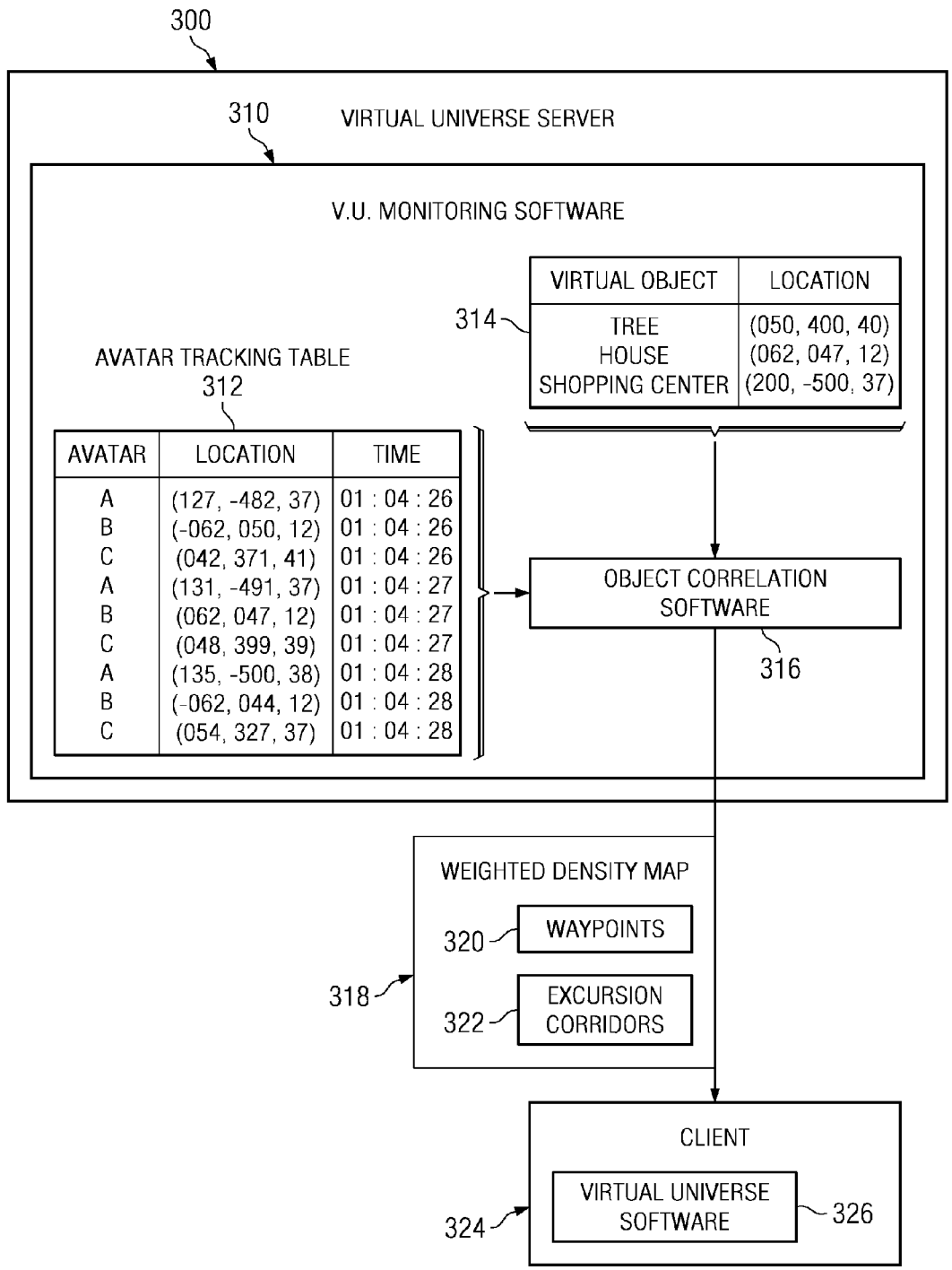
FIG. 3 is a block diagram of a virtual universe server in which illustrative embodiments may be implemented.

Referring now to FIG. 3, virtual universe server 300 is a server such as server 104 or 106. Virtual universe server 300 executes software to enable a virtual universe, and to allow clients to connect to, and interact within the virtual universe. Virtual universe server 300 stores all of the state information related to each virtual object, avatar, and landscape configuration. At any point in time, the virtual universe server knows the location of each avatar within the virtual environment.

According to an illustrative embodiment, virtual universe server 300 includes virtual universe monitoring software 310. Virtual universe monitoring software 310 can be implanted as part of the software enabling the virtual universe, or can be implemented as a stand alone, or plug in application that works in conjunction with the software enabling the virtual universe.

Virtual universe monitoring software 310 includes avatar tracking data structure 312. Avatar tracking data structure 312 is a data structure containing a time-based history of avatar locations throughout the virtual environment. Avatar tracking data structure 312 can be a data base, a linked list, a hash table, or other data structure capable of containing a time-based history of avatar locations throughout the virtual environment. The virtual universe server knows the location of each avatar within the virtual environment, and records those positions at certain time intervals. Thus, virtual universe monitoring software 310 can include avatar identification, as well as a location and time stamp. The location of an avatar can be implemented as a Cartesian, or other coordinate based system for easily representing a location within the virtual environment. The time stamp is provided at regular intervals, such as at the end of a clock-tic.

In one illustrative embodiment, entries within avatar tracking data structure 312 have a limited shelf life, and will expire after a duration of time has elapsed. Once an entry in avatar tracking data structure 312 has expired, it is removed from avatar tracking data structure 312. By allowing entries within avatar tracking data structure 312 to expire, virtual universe monitoring software 310 ensures that older avatar location information is not used in determining an excursion corridor.

Virtual universe monitoring software 310 includes virtual object table 314. Virtual object table 314 is a data structure that includes various virtual objects and their locations within the virtual environment. Virtual object table 314 is different from avatar tracking data structure 312, since virtual object table 314 includes those objects that are persistent, or semi-persistent within the virtual environment. That is, virtual object table 314 contains location information for non-avatar virtual objects. The location of a virtual object can be implemented as a Cartesian, or other coordinate based system for easily representing a location within the virtual environment.

Virtual universe monitoring software 310 includes object correlation software 316 that is used to generate weighted density map 318. Object correlation software 316 evaluates the historical avatar positions and their relative time-stamps to determine correlations amongst the activities of the various users in space and time. By weighing the frequency with which the various avatars visit certain locations, as well as the cumulative amount of time that an avatar spends at those certain locations, object correlation software 316 generates weighted density map 318. Weighted density map 318 is a time lapse representation of avatar location.

A regression analysis of the various avatar locations from within the avatar tracking data structure can therefore yield excursion corridors 322. Excursion corridors 322 are those frequently taken routes between various locations and points-of-interest within the virtual environment.

By comparing the locations of avatars within avatar tracking data structure 312 to the locations of virtual objects within virtual object table 314, object correlation software 316 can determine waypoints 320. Waypoints 320 are those virtual objects at which avatars congregate or linger. Waypoints 320 are thus the most probable end points for excursion corridors 322. Waypoints 320 can be any virtual object, but will typically be fixed object locations, such as a virtual building, or a virtual meeting place.

Client 324 accesses the virtual environment by executing virtual universe software 326. Waypoints 320 can be offered to client 324 as a set of selectable choices from within a graphical user interface of virtual universe software 326. Waypoints 320 which lie along excursion corridors 322 facilitate navigation to popular locations and points-of-interest within the virtual environment.

Excursion corridors 322 may be rendered visually to client 324. Excursion corridors 322 may be rendered as a luminescent pathway on the ground, or in the air. The thickness or brightness of the luminescent pathway can indicate the relative popularity of excursion corridor 322. A brighter or wider luminescent pathway can indicate a greater number of avatars that have previously navigated excursion corridor 322, while a fainter or narrower luminescent pathway can indicate a fewer number of avatars that have previously navigated excursion corridor 322.

Figure 4:
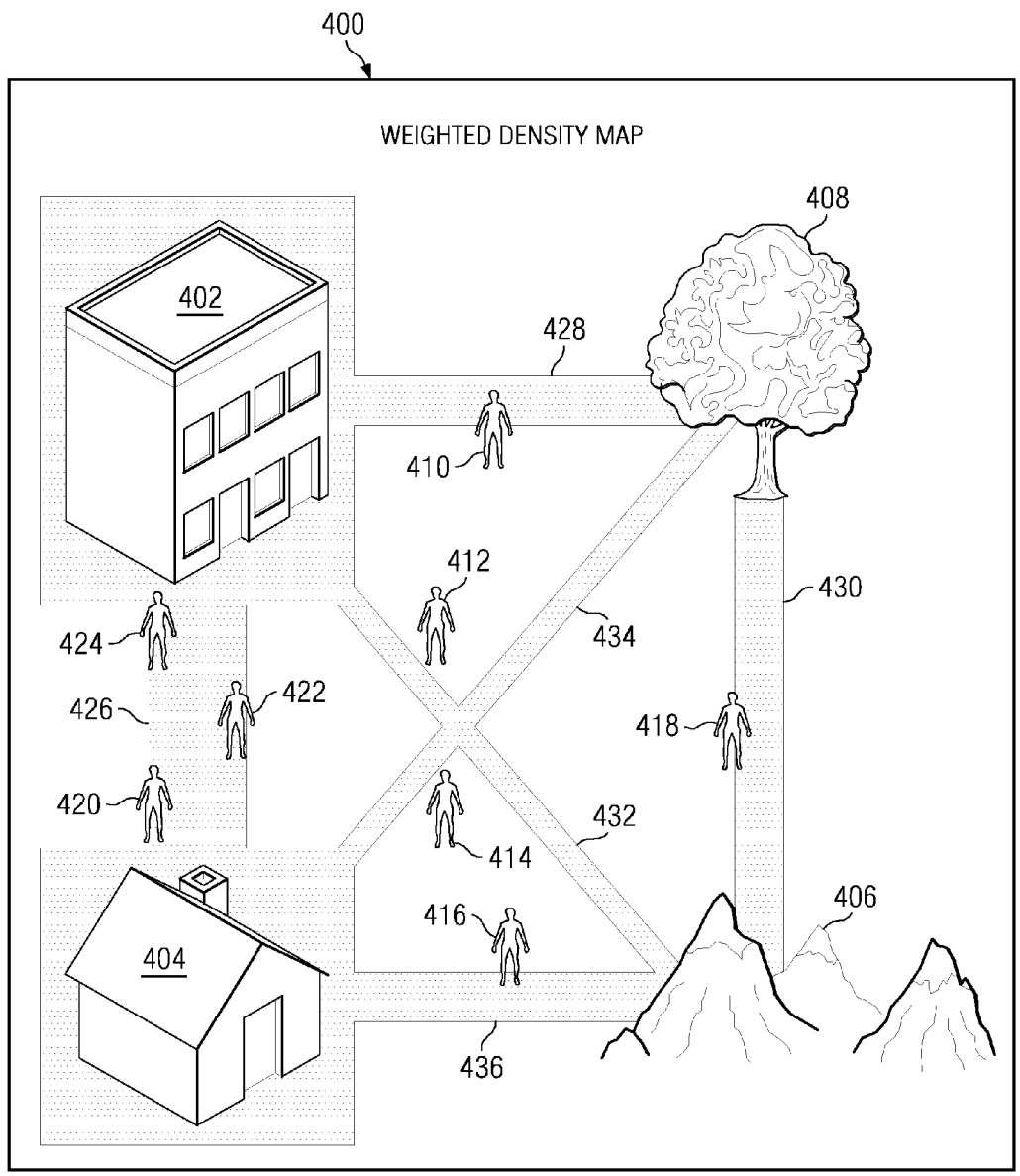
FIG. 4 is an isometric representation of a weighted density map of a virtual universe having excursion corridors and waypoints therein according to an illustrative embodiment.

Referring now to FIG. 4, an isometric representation of a weighted density map of a virtual universe having excursion corridors and waypoints therein is shown according to an illustrative embodiment. Weighted density map 400 can be weighted density map 318 of FIG. 3.

Weighted density map 400 includes virtual objects 402, 404, 406, and 408. Each of virtual objects 402, 404, 406, and 408 are represented at various locations within weighted density map 400. The various locations of virtual objects 402, 404, 406, and 408 are stored in a virtual object table, such as virtual object table 314 of FIG. 3.

Avatars 410-424 navigate through the virtual universe. As the avatars navigate the virtual universe, a virtual universe monitoring software, such as virtual universe monitoring software 310 of FIG. 3, monitors the locations of avatars 410-424. The locations of the avatars 410-424 are then stored in an avatar tracking data structure, such as avatar tracking data structure 312 of FIG. 3.

The recorded locations of avatars 410-424 within avatar tracking data structure 312 are then used to calculate excursion corridors 426-436. Excursion corridors 426-436 can be an excursion corridor such as excursion corridor 322 of FIG. 3. Excursion corridors 426-436 are those frequently taken routes between various locations and points-of-interest within the virtual environment.

As shown, excursion corridor 426 is a navigable route between virtual object 402 and virtual object 404. Excursion corridor 428 is a navigable route between virtual object 402 and virtual object 408. Excursion corridor 430 is a navigable route between virtual object 406 and virtual object 406. Excursion corridor 432 is a navigable route between virtual object 402 and virtual object 406. Excursion corridor 434 is a navigable route between virtual object 404 and virtual object 408. Excursion corridor 446 is a navigable route between virtual object 404 and virtual object 406.

Excursion corridors 426-436 may be rendered as a luminescent pathway on the ground, or in the air. The thickness or brightness of the luminescent pathway can indicate the relative popularity of excursion corridors 426-436. Excursion corridor 426 is a brighter or wider luminescent pathway indicating a greater number of avatars that have previously navigated excursion corridor 426. Excursion corridor 434 is a fainter or narrower luminescent pathway indicating a fewer number of avatars that have previously navigated excursion corridor 320.

In one illustrative embodiment an avatar can selectively filter the excursion corridors that are presented in the user interface based on the relative popularity of that excursion corridor. A more popular excursion corridor may indicate a more efficient route for navigating between two points. Conversely, a user may wish to take "the road less traveled," and prefer to navigate along a less popular excursion corridor.

Thus the user may choose to apply a high pass excursion corridor filter, a low pass excursion corridor filter, or a band pass excursion corridor filter to the available excursion corridors. If the user selects to utilize a high pass excursion corridor filter, the user is presented with only those excursion corridors that have been traveled by more than some minimum number of avatars. By selecting a high pass excursion corridor filter, the user would be preferentially presented with the most popular excursion corridors proximate to the user's location.

If the user selects to utilize a low pass excursion corridor filter, the user is presented with only those excursion corridors that have been traveled by less than some maximum number of avatars. By selecting a low pass excursion corridor filter, the user would be preferentially presented with those less popular excursion corridors proximate to the user's location. By following these less popular excursion corridors, the user could "take the scenic route."

If the user selects to utilize a band pass excursion corridor filter, the user is presented with only those excursion corridors that have been traveled by some number of avatars between both a minimum number of avatars and a maximum number of avatars. Users selecting a band pass excursion corridor filter may wish to not travel on the most popular of routes, but still navigate in a more directed manner than might be navigated on the least popular of excursion corridors.

In one illustrative embodiment, a user may wish to give preference to those excursion corridors that correspond to certain other avatars. Thus, the paths traveled by a friend, colleague, guide, or other preferred avatar could be preferentially weighted in determining weighted density map 400. These preferred avatars would have a greater cumulative effect on weighted density map 400 than would non-preferred avatars.

Figure 5:
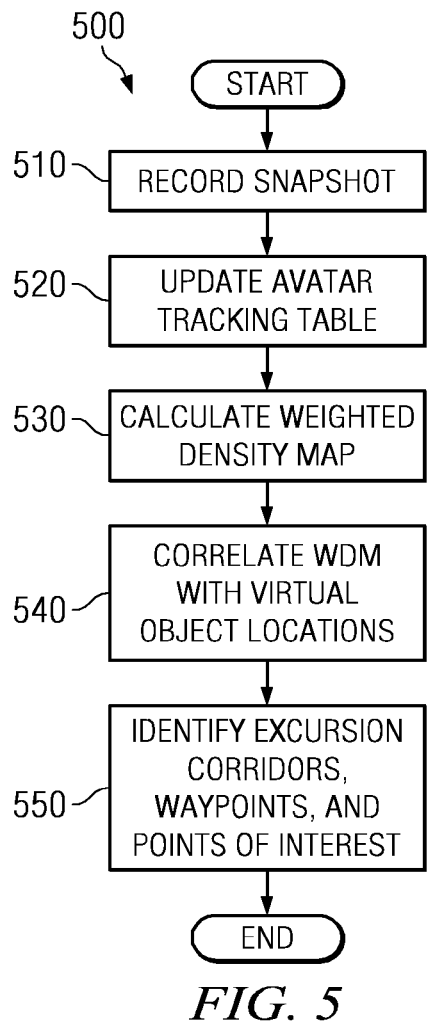
FIG. 5 is a flowchart showing a process for generating a weighted density map including waypoints and excursion corridors according to an illustrative embodiment.

Referring now to FIG. 5, a process for generating a weighted density map including waypoints and excursion corridors is shown according to an illustrative embodiment. Process 500 is a software process, executing on a software component, such as virtual universe monitoring software 310 of FIG. 3.

Process 500 begins by recording a snapshot of the location of avatars within the virtual universe virtual universe (step 510). The snapshot is a time-stamped location of avatars within the virtual universe.

Responsive to recording the snapshot, process 500 updates the avatar tracking data structure (step 520). The avatar tracking data structure can be avatar tracking data structure 312 of FIG. 3. Process 500 updates the avatar tracking data structure by storing the time-stamped present location of the avatars within the tracking table. Process 500 may further update the avatar tracking data structure by deleting expired time-stamped locations from the avatar tracking data structure.

Responsive to updating the avatar tracking data structure, process 500 calculates a weighted density map (step 530). The weighted density map can be weighted density map 318 of FIG. 3.

Responsive to generating the weighted density map, process 500 correlates the weighted density map with virtual object locations (step 540). Virtual object locations are the location information for non-avatar virtual objects. The location of a virtual object can be implemented as a Cartesian, or other coordinate based system for easily representing a location within the virtual environment. Virtual object locations are retrieved from a virtual object table, such as virtual object table 314 of FIG. 3.

Responsive to correlating the weighted density map with virtual object locations, process 500 identifies excursion corridors, waypoints, and points-of-interest (step 550), with the process terminating thereafter. Process 500 can perform a regression analysis of the various avatar locations from within the avatar tracking data structure to yield the excursion corridors. The excursion corridors are those frequently taken routes between various locations and points-of-interest in the virtual environment. By comparing the locations of avatars within the avatar tracking data structure to the locations of virtual objects within the virtual object table, process 500 can determine waypoints and points-of-interest. Waypoints and points-of-interest are those virtual objects at which avatars congregate or linger. Waypoints are thus the most probable end points for excursion corridors. Waypoints can be any virtual object, but will typically be fixed object locations, such as a virtual building, or meeting place.

Figure 6:
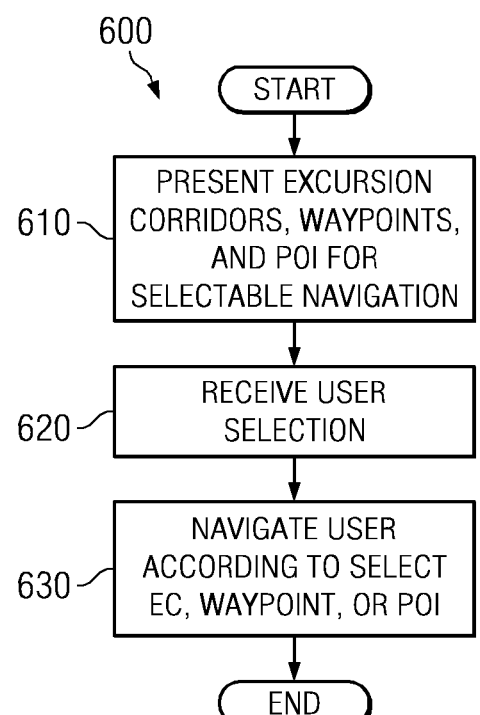
FIG. 6 is a flowchart showing a process for selecting a navigable waypoint from a graphical user interface according to an illustrative embodiment.

Referring now to FIG. 6, a process for selecting a navigable waypoint from a graphical user interface is shown according to an illustrative embodiment. Process 600 is a software process executing on a software component, such as virtual universe software 326 of FIG. 3.

Process 600 begins by presenting excursion corridors, waypoints, and points of interest for selectable navigation, taking into account any excursion corridor filter selected by the user (step 610). Excursion corridors, waypoints, and points-of-interest can be presented to a user through a graphical user interface. The graphical user interface can present a set of excursion corridors proximately located to the user's avatar, listing the nearby virtual paths, as well as their related endpoints, or points-of-interest that lie along the excursion corridor. The user can then select an excursion corridor from a menu.

Responsive to presenting excursion corridors, process 600 receives the user selection of an excursion corridor (step 620). The user selects the chosen excursion corridor from a set of excursion corridors proximately located to the user's avatar. The chosen excursion corridor can be selected from a menu listing the nearby virtual paths, as well as their related endpoints, or points-of-interest that lie along the excursion corridor.

Responsive to receiving the user selection of the excursion corridor, process 600 navigates the user according to the selected excursion corridor, waypoint, or point of interest (step 630), with the process terminating thereafter. Once the excursion corridor is selected, the user could be automatically navigated along the excursion corridor. Conversely, a set of navigational cues could be provided to the user that would enable the user to maintain travel along the selected excursion corridor. The navigational cues could be a visual cues, such as a luminescent trail, a three dimensional network of lines, a texture overlay, a discolored ground appearance depicting a "worn" pathway. The navigational cues could also be auditory cues, such as a tone or audio signal to alert the user of when the avatar is within the selected excursion corridor, or has wandered too far off of the selected excursion corridor.

Thus, the illustrative embodiments herein describe a method for discovering valued excursion corridors within a virtual world. Sighted users within a virtual world tend to travel purposefully using visual landmarks, even when performing an initial exploration of the virtual environment. Routes which are frequently taken by the avatars of these sighted users may represent valuable information for blind users. The cumulative travel route histories may be deemed as an interconnected set of invisible "beaten paths" which have previously been most commonly used by avatars in navigating through the virtual environment. Each path is not only a route which many other avatars have not only successfully traveled, but also is a pathway which users of those avatars valued for some reason. These paths can be offered to blind users as a set of excursion corridors.

A user can choose from a set of excursion corridors proximately located to the user's avatar. The chosen excursion corridor can be selected from a menu listing the nearby virtual paths, as well as their related endpoints, or points-of-interest that lie along the excursion corridor. Once the excursion corridor is selected, the user could be automatically navigated along the excursion corridor. Conversely, a set of navigational cues could be provided to the user that would enable the user to maintain travel along the selected excursion corridor.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining an excursion corridor within a virtual environment, the computer implemented method comprising:
    recording a time-stamped snapshot of a location of at least one avatar within the virtual universe;
    responsive to recording a time-stamped snapshot, updating an avatar tracking data structure, wherein the avatar tracking data structure provides a time-based history of avatar locations within the virtual universe;
    responsive to updating the avatar tracking data structure, generating a weighted density map, wherein the weighted density map is a time lapse representation of the location of the at least one avatar within the virtual universe;
    responsive to generating the weighted density map, correlating the weighted density map with a plurality of virtual object locations, wherein each of the plurality of virtual object locations corresponds to one of a plurality of virtual objects;
    responsive to correlating the weighted density map with the plurality of virtual object locations, identifying at least one excursion corridor, wherein the at least one excursion corridor identifies frequently taken routes between the plurality of virtual object locations;
    responsive to correlating the weighted density map with the plurality of virtual object locations, identifying at least one waypoint, wherein the waypoint corresponds to one of the plurality of virtual objects, and wherein the waypoint is an endpoint for at least one of the at least one excursion corridor; and
    presenting the at least one excursion corridor and the at least one waypoint to a client, wherein presenting the at least one excursion corridor and the at least one waypoint to the client comprises:
    presenting at least one navigational cue to the client, wherein the navigational cue indicates a relative number of avatars that have previously navigated the at least one excursion corridor, and wherein the navigational cue is selected from a visual cue and an auditory cue, wherein the visual cue comprises at least one of a luminescent trail, a three dimensional network of lines, a texture overlay, and a discolored ground appearance; and
    applying a pass excursion corridor filter to the at least one excursion corridor, wherein the pass excursion corridor filter is selected from the group consisting of a high pass excursion corridor filter and a low pass excursion corridor filter, wherein the high pass excursion corridor filter includes only ones of the at least one excursion corridor that have been traveled by more than a minimum number of avatars, and wherein the low pass excursion corridor filter includes only ones of the at least one excursion corridor that have been traveled by less than a maximum number of avatars.

2. The computer implemented method of claim 1, wherein the computer implemented method further comprises:
    receiving a selection of the at least one excursion corridor or the at least one waypoint; and
    navigating an avatar of the client according to the selection of the at least one excursion corridor or the at least one waypoint.

3. The computer implemented method of claim 2, wherein the step of navigating the client further comprises providing a set of auditory navigational cues to the client that enable the client to maintain travel along the at least one excursion corridor.

4. The computer implemented method of claim 1, wherein the step of updating the avatar tracking data structure further comprises:
    updating the avatar tracking data structure by adding the time-stamped snapshot of the location of at the least one avatar within the virtual universe; and
    deleting any expired entries from the avatar tracking data structure.

5. A computer program product comprising:
    a non-transitory computer usable memory including computer usable program code for determining an excursion corridor within a virtual environment, the computer program product comprising:
    computer usable program code for recording a time-stamped snapshot of a location of at least one avatar within the virtual universe;
    computer usable program code, responsive to recording a time-stamped snapshot, for updating an avatar tracking data structure, wherein the avatar tracking data structure provides a time-based history of avatar locations within the virtual universe;
    computer usable program code, responsive to updating the avatar tracking data structure, for generating a weighted density map, wherein the weighted density map is a time lapse representation of the location of the at least one avatar within the virtual universe;
    computer usable program code, responsive to generating the weighted density map, for correlating the weighted density map with a plurality of virtual object locations, wherein each of the plurality of virtual object locations corresponds to one of a plurality of virtual objects;
    computer usable program code, responsive to correlating the weighted density map with the plurality of virtual object locations, for identifying at least one excursion corridor, wherein the at least one excursion corridor identifies frequently taken routes between the plurality of virtual object locations;
    computer usable program code, responsive to correlating the weighted density map with the plurality of virtual object locations, for identifying at least one waypoint, wherein the waypoint corresponds to one of the plurality of virtual objects, and wherein the waypoint is an endpoint for at least one of the at least one excursion corridor; and
    computer usable program code for presenting the at least one excursion corridor and the at least one waypoint to a client, wherein the computer usable program code for presenting the at least one excursion corridor and the at least one waypoint to the client further comprises:
    computer usable program code for presenting at least one navigational cue to the client, wherein the navigational cue indicates a relative number of avatars that have previously navigated the at least one excursion corridor, and wherein the navigational cue is selected from a visual cue and an auditory cue, wherein the visual cue comprises at least one of a luminescent trail, a three dimensional network of lines, a texture overlay, and a discolored ground appearance; and computer usable program code for applying a pass excursion corridor filter to the at least one excursion corridor, wherein the pass excursion corridor filter is selected from the group consisting of a high pass excursion corridor filter and a low pass excursion corridor filter, wherein the high pass excursion corridor filter includes only ones of the at least one excursion corridor that have been traveled by more than a minimum number of avatars, and wherein the low pass excursion corridor filter includes only ones of the at least one excursion corridor that have been traveled by less than a maximum number of avatars.

6. The computer program product of claim 5, wherein the computer program product further comprises:

computer usable program code for receiving a selection of the at least one excursion corridor or the at least one waypoint; and navigating an avatar of the client according to the selection of the at least one excursion corridor or the at least one waypoint.

7. The computer program product of claim 6, wherein computer usable program code for navigating the client further comprises computer usable program code for providing a set of auditory navigational cues to the client that enable the client to maintain travel along the at least one excursion corridor.

8. The computer program product of claim 5, wherein the step of updating the avatar tracking data structure further comprises:

updating the avatar tracking data structure by adding the time-stamped snapshot of the location of at the least one avatar within the virtual universe; and deleting any expired entries from the avatar tracking data structure.

9. A data processing system comprising:
a bus system;
a communications system coupled to the bus system;
a memory connected to the bus system, wherein the memory includes computer usable program code for determining an excursion corridor within a virtual environment; and
a processing unit coupled to the bus system, wherein the processing unit executes the computer usable program code to record a time-stamped snapshot of a location of at least one avatar within the virtual universe; responsive to recording a time-stamped snapshot, to update an avatar tracking data structure, wherein the avatar tracking data structure provides a time-based history of avatar locations within the virtual universe; responsive to updating the avatar tracking data structure, to generate a weighted density map, wherein the weighted density map is a time lapse representation of the location of the at least one avatar within the virtual universe; responsive to generating the weighted density map, to correlate the weighted density map with a plurality of virtual object locations, wherein each of the plurality of virtual object locations corresponds to one of a plurality of virtual objects; responsive to correlating the weighted density map with the plurality of virtual object locations, to identify at least one excursion corridor, wherein the at least one excursion corridor identifies frequently taken routes between the plurality of virtual object locations; responsive to correlating the weighted density map with the plurality of virtual object locations, to identify at least one waypoint, wherein the waypoint corresponds to one of the plurality of virtual objects, and wherein the waypoint is an endpoint for at least one of the at least one excursion corridor; and wherein the processing unit further executes the computer usable program code to present the at least one excursion corridor and the at least one waypoint to a client, wherein presenting the at least one excursion corridor and the at least one waypoint to the client further comprises: presenting at least one navigational cue to the client, wherein the navigational cue indicates a relative number of avatars that have previously navigated the at least one excursion corridor, and wherein the navigational cue is selected from a visual cue and an auditory cue, wherein the visual cue comprises at least one of a luminescent trail, a three dimensional network of lines, a texture overlay, and a discolored ground appearance; and applying a pass excursion corridor filter to the at least one excursion corridor, wherein the pass excursion corridor filter is selected from the group consisting of a high pass excursion corridor filter and a low pass excursion corridor filter, wherein the high pass excursion corridor filter includes only ones of the at least one excursion corridor that have been traveled by more than a minimum number of avatars, and wherein the low pass excursion corridor filter includes only ones of the at least one excursion corridor that have been traveled by less than a maximum number of avatars.

10. The data processing system of claim 9, wherein the processing unit executes the computer usable program code to receive a selection of the at least one excursion corridor or the at least one waypoint; and navigate an avatar of the client according to the selection of the at least one excursion corridor or the at least one waypoint.

11. The data processing system of claim 10, wherein the processing unit executing the computer usable program code to navigate the client further comprises the processing unit executing the computer usable program code to provide a set of auditory navigational cues to the client that enable the client to maintain travel along the at least one excursion corridor.

12. The data processing system of claim 9, wherein the processing unit executing the computer usable program code to update the avatar tracking data structure further comprises:

the processing unit executing the computer usable program code to update the avatar tracking data structure by adding the time-stamped snapshot of the location of at the least one avatar within the virtual universe; and to delete any expired entries from the avatar tracking data structure.

* * * * *